UNITED STATES PATENT OFFICE.

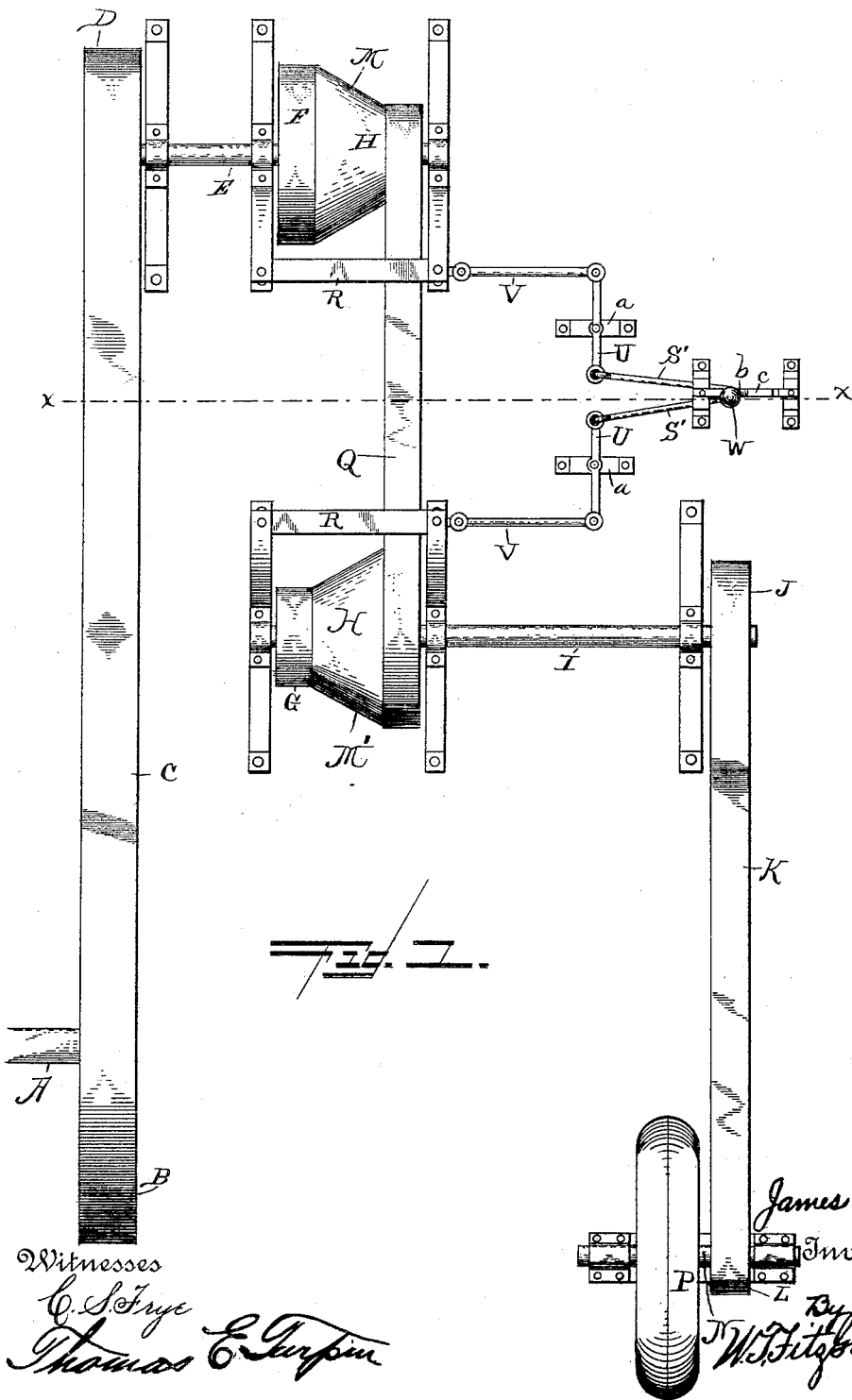

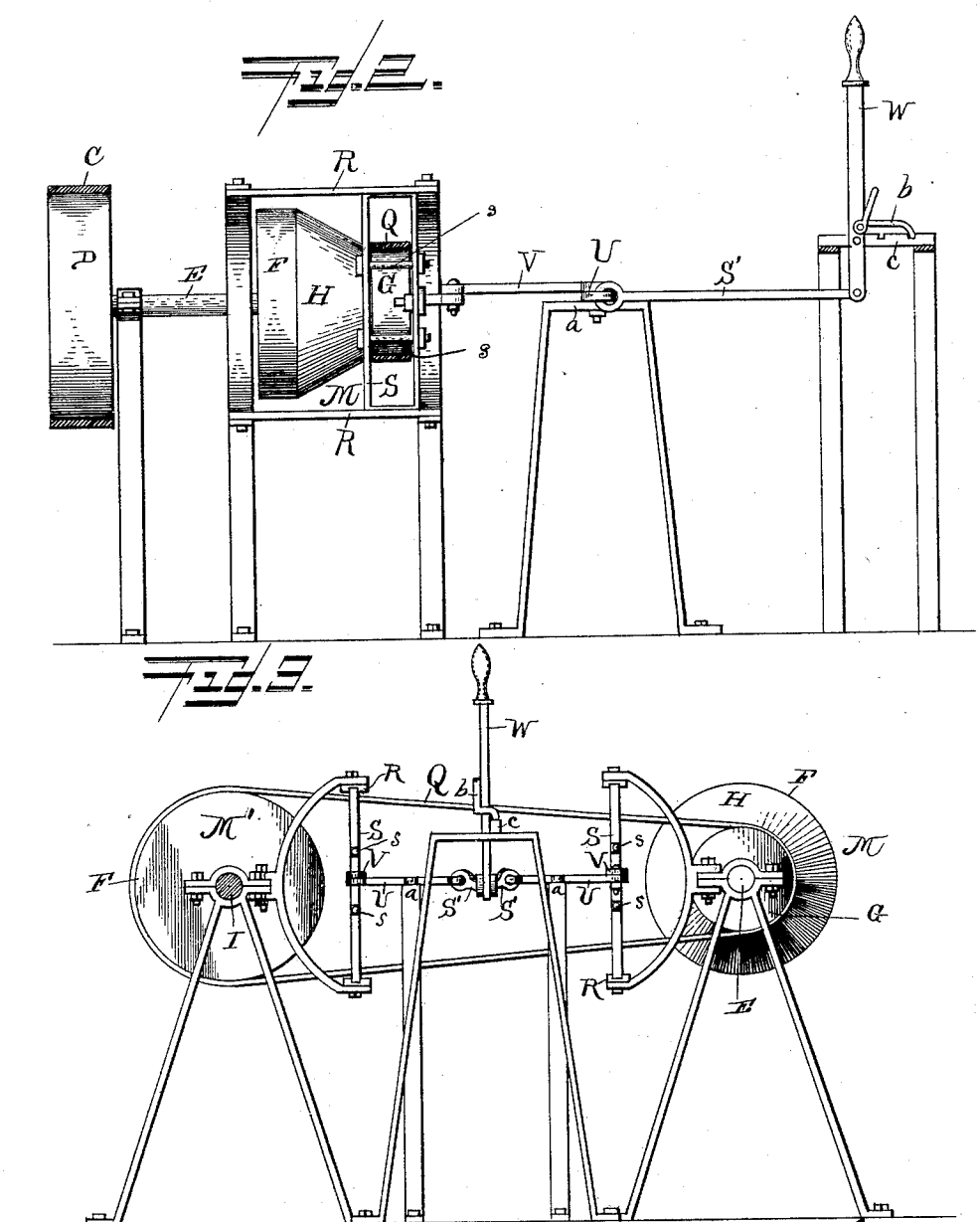

JAMES FISHER, OF NEW ORLEANS, LOUISIANA.

BELT-AND-PULLEY GEARING.

SPECIFICATION forming part of Letters Patent No. 477,108, dated June 14, 1892.

Application filed February 13, 1892. Serial No. 421,402. (No model.)

*To all whom it may concern:*

Be it known that I, JAMES FISHER, a citizen of the United States, residing at New Orleans, in the parish of Orleans and State of Louisiana, have invented certain new and useful Improvements in Belt-and-Pulley Gearings; and I do hereby declare the following to be a full, clear, and exact description of the invention, such as will enable others skilled in the art to which it appertains to make and use the same.

My invention has relation to an improved belt-and-pulley gearing for transmitting motion from the drive-shaft of a bagasse-engine to the rotary blast-fan of a bagasse-furnace; and it consists in the provision of stepped pulleys intermediate the engine and fan-shafts, a series of belts, and shifting mechanism for changing the belt between the stepped pulleys from one step to another thereof, whereby the rotatory speed of the fan may be regulated, as described, without affecting the speed of the engine.

The invention will be fully understood from the following description and claims, when taken in conjunction with the accompanying drawings, in which—

Figure 1 is a diagrammatic plan illustrating the gearing intermediate the engine and fan-shafts, together with the belt-shifting mechanism in an operative position. Fig. 2 is a vertical section taken in the plane indicated by line $x\,x$ on Fig. 1; and Fig. 3 is an end elevation of the stepped pulleys, together with the belt-shifting mechanism.

In the said drawings similar letters designate corresponding parts throughout the several views, referring to which—

A designates the drive-shaft of a bagasse-engine, which may be of the ordinary or any approved construction, and B indicates a pulley fixed on said shaft A. This pulley B, which is preferably of the proportional diameter illustrated, is connected by a belt C with a pulley D, fixed upon the end of the intermediate shaft E. Also fixed upon the intermediate shaft E is a stepped pulley M, which is preferably of about the proportional length illustrated, and comprises the large cylindrical step F, the small cylindrical step G, and the intermediate truncated-cone-shaped portion H, intermediate the steps F and G, which serve in practice to facilitate the shifting of the belt from one step to the other.

Situated at a suitable point with respect to the intermediate shaft E is another intermediate shaft I, upon which is fixed a belt-pulley J, which is connected by a belt K with a pulley L upon the fan-shaft N, which shaft is journaled in suitable bearings and carries a suitable fan within the casing P, which may be of the ordinary or any approved construction.

Fixedly mounted upon the shaft I and preferably in the same vertical plane as the stepped pulley M of the shaft E is a stepped pulley M', which is similar in construction to the pulley M, but is so arranged upon its shaft that its large step F will be opposite to or in the same vertical plane as the small step G of the pulley M, while its smaller step G will be opposite to or in the same vertical plane as the large step F of said pulley M, whereby it will be readily perceived that when the belt Q, connecting the stepped pulleys, is shifted laterally upon the step F of the pulley M and upon the step G of the pulley M' the speed of said pulley M' and the fan will be increased, and when the said belt is shifted so as to rest on the step G of the pulley M and the step F of the pulley M' the speed of the latter pulley, together with that of the fan, will be decreased.

From the foregoing description it will be readily perceived that the belt Q must be shifted simultaneously on the pulleys M M', and to this end I have provided the shifting mechanism, which I will now proceed to describe.

Arranged in the same vertical plane upon one side of each of the pulleys M M' and extending parallel therewith are tracks or guide-supports R, upon which are suitably mounted and secured the adjustable loops S, which surround the belt and are designed and adapted to engage the longitudinal edges of said belt when it is desirable to shift the same. These loops S are preferably provided with brace-bolts $s$, as shown, which also serve to hold the upper and lower portions of the belt Q apart.

Fulcrumed in suitable bearings $a$, arranged at proper points with respect to the pulleys M M' are levers U, to the outer ends of which are connected the links V, which are pivotally connected at their opposite ends to the loops S, whereby it will be seen that when the levers are rocked the loops will be moved in a corresponding direction to the lower or weight ends of said levers.

Fulcrumed at a suitable point with respect to the levers U is a hand-lever W, which is preferably provided with a detent $b$, adapted to engage a rack $c$, so as to fix the lever in its adjusted position. Pivotally connected at one end to the weight end of the lever W and at their opposite ends to the power or inner ends of the levers U are links S', whereby it will be seen that when the lever W is rocked the levers U will also be rocked and the loops S, together with the belt Q, will be moved.

From the foregoing description it will be readily perceived that I have provided a gearing intermediate the engine-shaft and the fan-shaft, and a means for shifting the belt between the stepped pulleys, whereby the speed of the fan may be readily regulated without affecting the speed of the engine, which in ordinary practice is also used to run a grinding-mill or the like.

Although I have specifically described the construction and relative arrangement of the several elements of my improvements, yet I do not desire to be confined to the same, as such changes or modifications may be made as fairly fall within the scope of my invention.

Having thus described my invention, what I claim, and desire to secure by Letters Patent, is—

1. In a belt-and-pulley gearing for transmitting motion from an engine-shaft to a fan-shaft, the combination, with the engine-shaft, a pulley fixed thereon, the fan-shaft, and a pulley fixed on said shaft, of the intermediate shaft E, a pulley fixed on said shaft, a belt taking around the pulley on the engine-shaft and the pulley on the intermediate shaft E, the stepped pulley fixed on the shaft E, the intermediate shaft I, the pulley fixed on said shaft, the belt taking around the pulley on the fan-shaft and the pulley on the shaft I, the stepped pulley arranged on the shaft I and having its large step arranged opposite to or in the same vertical plane as the small step of the pulley on the shaft E and its small step arranged opposite to or in the same vertical plane as the large step of the pulley on the shaft E, a belt taking around the stepped pulleys of the shafts E and I, and a suitable means for shifting said belt laterally, substantially as and for the purpose set forth.

2. In a belt-and-pulley gearing, substantially as described, the combination, with the shaft E, the shaft I, the stepped pulley M, fixed on the shaft E and comprising the large step, the small step, and the intermediate truncated-cone-shaped portion, the stepped pulley M', fixed on the shaft I and comprising the large step arranged opposite to or in the same vertical plane as the small step of the pulley M, the small step arranged opposite to or in the same vertical plane as the large step of said pulley M, and the intermediate truncated-cone-shaped portion, and the belt connecting the stepped pulleys M M', of the guide supports or tracks arranged at the sides of the pulleys, the loops movable on said tracks and surrounding the belt, the levers U, the hand-lever, the links connecting the weight end of the hand-lever and the power ends of the levers U, and links connecting the weight ends of said levers U and the movable saddles, all substantially as specified.

In testimony whereof I affix my signature in presence of two witnesses.

JAMES FISHER.

Witnesses:
   HERMAN ZUBERBIER, Jr.,
   JAS. DOURIS.